United States Patent [19]

Combrowski

[11] Patent Number: 5,223,128
[45] Date of Patent: Jun. 29, 1993

[54] APPARATUS FOR CLEANING A BATH OF LIQUID WITH CONVEYOR BELT AND ADJUSTABLE STRIPPER

[75] Inventor: Zbigniew Combrowski, Tuttlingen, Fed. Rep. of Germany

[73] Assignee: C & H Werkzeugmaschinen GmbH, Tuttlingen, Fed. Rep. of Germany

[21] Appl. No.: 795,332

[22] Filed: Nov. 20, 1991

[30] Foreign Application Priority Data

Sep. 14, 1991 [DE] Fed. Rep. of Germany ....... 9111450
Oct. 23, 1991 [DE] Fed. Rep. of Germany ....... 9113152

[51] Int. Cl.⁵ ..................... B65G 45/12; B65G 15/42; B01D 17/12
[52] U.S. Cl. .................... 210/138; 198/497; 198/643; 210/242.4; 210/924
[58] Field of Search ............. 198/497, 498, 499, 643; 184/6.21, 6.24; 210/138, 168, 171, 232, 242.3, 242.4, 387, 401, 924, 396; 166/64, 66.4

[56] References Cited

U.S. PATENT DOCUMENTS

| | | | |
|---|---|---|---|
| 55,178 | 5/1866 | Toule | 198/643 |
| 1,511,506 | 10/1924 | Cortes | 198/643 |
| 1,601,349 | 9/1926 | Cortes | 198/643 |
| 1,703,963 | 3/1929 | Scruby | 198/643 |
| 2,580,332 | 12/1951 | Teetor | 166/64 |
| 2,704,981 | 3/1955 | Gustafson | 198/643 |
| 4,440,642 | 4/1984 | Frese et al. | 210/168 |
| 4,715,964 | 12/1987 | Harms | 210/387 |
| 4,865,724 | 9/1989 | Brandt et al. | 210/401 |
| 4,876,011 | 10/1989 | Betts et al. | 210/924 |
| 4,919,825 | 4/1990 | Croket | 210/401 |
| 5,015,378 | 5/1991 | Lewan | 210/924 |
| 5,062,953 | 11/1991 | Lewan | 210/242.4 |
| 5,113,999 | 5/1992 | Zeppenfeld | 198/497 |

FOREIGN PATENT DOCUMENTS 3822485 1/1989 Fed. Rep. of Germany ...... 210/387

*Primary Examiner*—Joseph W. Drodge
*Attorney, Agent, or Firm*—Bachman & LaPointe

[57] ABSTRACT

Apparatus for cleaning a bath of liquid, in particular a metal-working machine lubricant and/or coolant, by means of a conveyor belt which is fed around a drive roller, driven by a motor, in a chamber of a housing and dips into the bath of liquid, characterized in that the conveyor belt is provided with a stripper having a stripping edge directed oppositely to the direction of rotation of the conveyor belt.

8 Claims, 4 Drawing Sheets

APPARATUS FOR CLEANING A BATH OF LIQUID WITH CONVEYOR BELT AND ADJUSTABLE STRIPPER

BACKGROUND OF THE INVENTION

The invention relates to an apparatus for cleaning a bath of liquid, in particular a metal-working machine lubricant and/or coolant, by means of a conveyor belt which is fed around a drive roller, driven by a motor, in a chamber of a housing and dips into the bath of liquid.

In particular, coolants are used for cooling and lubricating in the machining of metal. Said coolants have a manufacturer-dependent service life which is, however, impaired by oil leakages, for example from central lubrication systems. As a result of oil floating, the coolant no longer receives oxygen and can no longer breathe. The result is dumping of the coolant, resulting in service life losses, Bacterial cultures are formed which result in skin rashes among the employees and in very unpleasant odor nuisance. This reduces the working hygiene. Furthermore, the waste disposal costs are higher for such a coolant, since the replacement intervals have to be kept very short.

Such apparatuses, also referred to as oil skimmers, are used to keep the necessary lubricant or coolant homogeneous and free of contaminants in machine tools, roll stands or the like. Said lubricant or coolant is fed from a reservoir to a machine and is returned again from the latter to the reservoir enriched with oil, dirt, foam and solids.

A very wide variety of cleaning and filtering apparatuses are used to clean this liquid. A preliminary cleaning can already be brought about in the reservoir itself by sedimentation and flotation. It is true that fairly large and, in particular, specifically heavy particles can be separated out by sedimentation; the sediment is, however, impeded by the flotation, which acts in the opposite direction. In particular, in the case of oil-in-water emulsions, ferritic abrasion often binds to free oil and rises with it.

Also known on the market are conveyor belts of the abovementioned type which dip into the bath of liquid. To remove oil, a counter roller by means of which the conveyor belt is, as it were, squeezed out, is as a rule disposed near the drive roller. The contaminants then flow laterally out of the gap between counter roller and drive roller. Such a cleaning of the conveyor belt leaves very much to be desired since substantial amounts of oil residues, dirt, foam and solids are fed back into the bath again.

SUMMARY OF THE INVENTION

The object of the present invention is to develop an apparatus of the abovementioned type in which the cleaning of the conveyor belt is substantially improved and the entire construction is simplified.

This object is achieved in that the conveyor belt is provided with a stripper having a stripping edge directed oppositely to the direction of rotation of the conveyor belt.

The stripper is so designed that it reliably removes not only oil, but also foam and solids and other dirt from the surface of the conveyor belt and feeds them to a discharge. In this case, the cleaning of the conveyor belt is substantially better, the cleaning still depending on a chosen stripping-edge contact pressure.

According to the invention, said contact pressure is regulated in a simple way by moving the stripper in the longitudinal direction of the belt. Specifically, the stripping edge should be at a somewhat greater distance from a housing wall than the suspended conveyor belt. In a preferred exemplary embodiment, the stripper is constructed as a collecting trough, a peripheral edge of said trough forming the stripping edge. The rear wall of said collecting trough is then fastened to a housing wall so as to be vertically movable, which can be done, for example, by feeding threaded bolts into elongated holes. If said collecting trough is raised or lowered, the pressure of the stripping edge on the conveyor belt or the drive roller increases or decreases. This is a very simple but effective way of improving the cleaning of the conveyor belt.

Since the stripping edge applies an increased pressure to the conveyor belt, slippages of the conveyor belt on the surface of the drive roller may occur. Said slippages are counteracted by a ribbing which is formed into the surface of the drive roller.

An important feature of the present invention is also the compact construction, which insures an easy assembly of the entire apparatus and, correspondingly, also an easy replacement of worn parts. This includes the fact that the drive roller is inserted so as to be easily removable, with the result that, in particular, a damaged conveyor belt can be replaced very quickly. For this purpose, the drive roller has an axial bore so that, during assembly, the drive roller is pushed into a counterbearing fixed to a housing wall and the drive shaft is inserted into the axial bore from the other side. For this reason, the entire housing is also of two-part construction. The actual skimmer housing is open on one side and at the bottom, whereas the motor housing, which holds, in particular, the geared motor, is formed solely from a U-shaped profiled section. Said motor housing, from which the drive shaft projects, is pushed laterally or from below into the skimmer housing and fastened with screws in the desired position. To clean or replace parts, it is then only necessary for the motor housing to be removed from the skimmer housing.

An integrated timer, which can also easily be removed, is used to improve the control of the geared motor or to fix a running time of the geared motor.

A further improvement in an oil skimmer is achieved in that vanes are formed at least onto one side of a weighting roller which is normally in the conveyor belt inside the bath of liquid and concomitantly rotates with the conveyor belt. It should be expressly pointed out that this development of a weighting roller may, of course, also be applied in already known oil skimmers and therefore, viewed on its own, it also independently requires protection, in which connection, however, the combination of this feature, in particular, with the preferred embodiments just described provides an outstanding contribution to the achievement of the object.

Normally side flanges, between which the belt runs, are formed onto the weighting roller on both sides. In this case, it is sufficient if the corresponding vanes are formed onto said side flanges, bucket wheels in a certain sense thereby being formed.

When the belt moves, the weighting roller is also rotated, i.e. the bucket wheels are set in motion. This achieves a surface suction, i.e. dirt and oil are sucked in from the surface of the bath of liquid to be cleaned and from a rather greater distance and fed to the belt. Substantially more dirt and oil therefore gets picked up by said belt, with the result that a substantially improved cleaning is achieved.

The vanes should be replaceable or deformable or adjustable according to requirement. As a result of this, a larger or a smaller suction can be achieved, depending on the type of container the oil skimmer is used in.

BRIEF DESCRIPTION OF THE DRAWINGS

Further advantages, features and details of the invention emerge from the description below of preferred exemplary embodiments and also from reference to the drawings; in the latter

DETAILED DESCRIPTION

Figure 1:
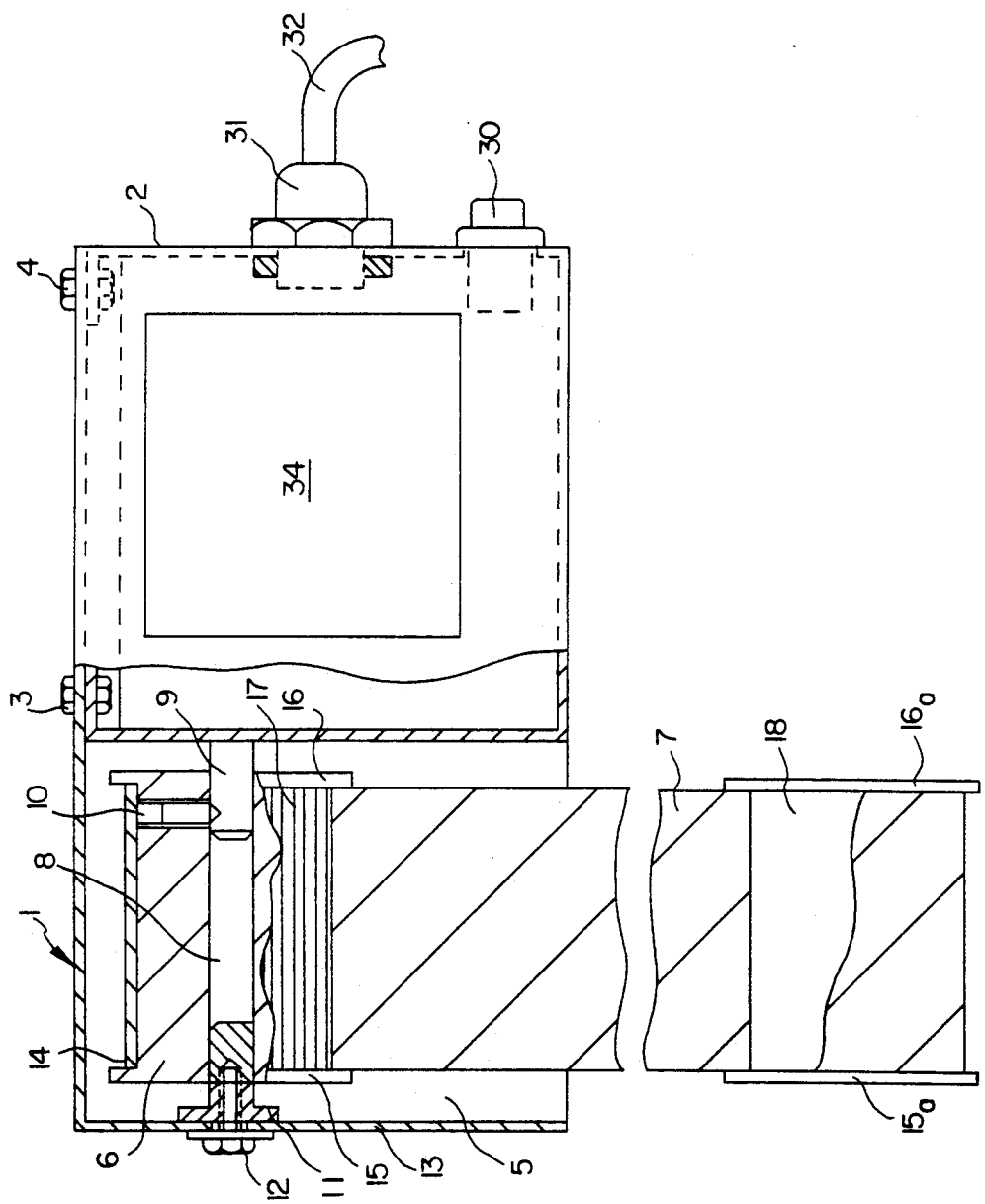
FIG. 1 shows a front view, partly cut away, of an oil skimmer according to the invention.

According to FIG. 1, an oil skimmer according to the invention has a skimmer housing 1 which is open at the bottom and on the right hand side. A motor housing 2 is inserted into said skimmer housing 1 from the right hand side and joined to the skimmer housing 1 by means of corresponding screws 3 and 4. In this process, there is formed on the left hand side, next to the motor housing 2, a chamber 5 which is open at the bottom and in which a drive roller 6 for a conveyor belt 7 is disposed.

The drive roller 6 has an axial bore 8 into which a drive shaft 9, which is fixed by means of a grub screw 10, projects from the side of the motor housing 2.

From the other side, a counter bearing 11 also projects into the axial bore 8, said counter bearing 11 being held by an axial screw 12 on a side wall 13 of the skimmer housing 1.

The conveyor belt 7 is fed, in addition, on the drive roller 6 in a channel 14 between two side flanges 15 and 16. To improve its adhesion to the surface of the drive roller 6, the latter is provided with a ribbing 17.

So that the conveyor belt 7 can dip into a bath of liquid, not shown in greater detail, when in operation, it is provided at the other end with respect to the drive roller 6 with a weighing roller 18 which is suspended in the conveyor belt 7 formed as an endless belt, said conveyor belt 7 there again being fed between two side flanges 15a and 16a.

Figure 2:
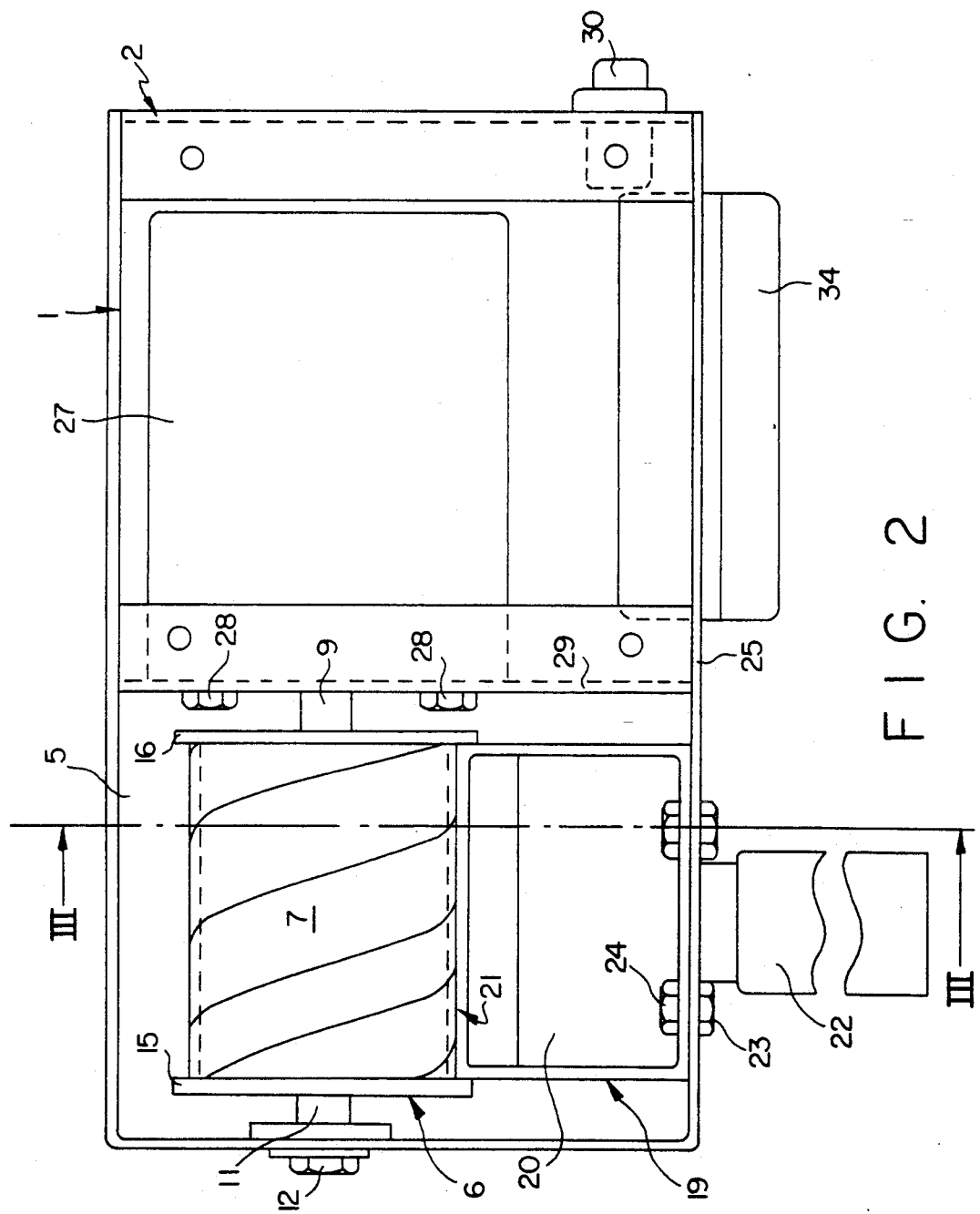
FIG. 2 shows a plan view of the open oil skimmer according to FIG. 1.
Figure 3:
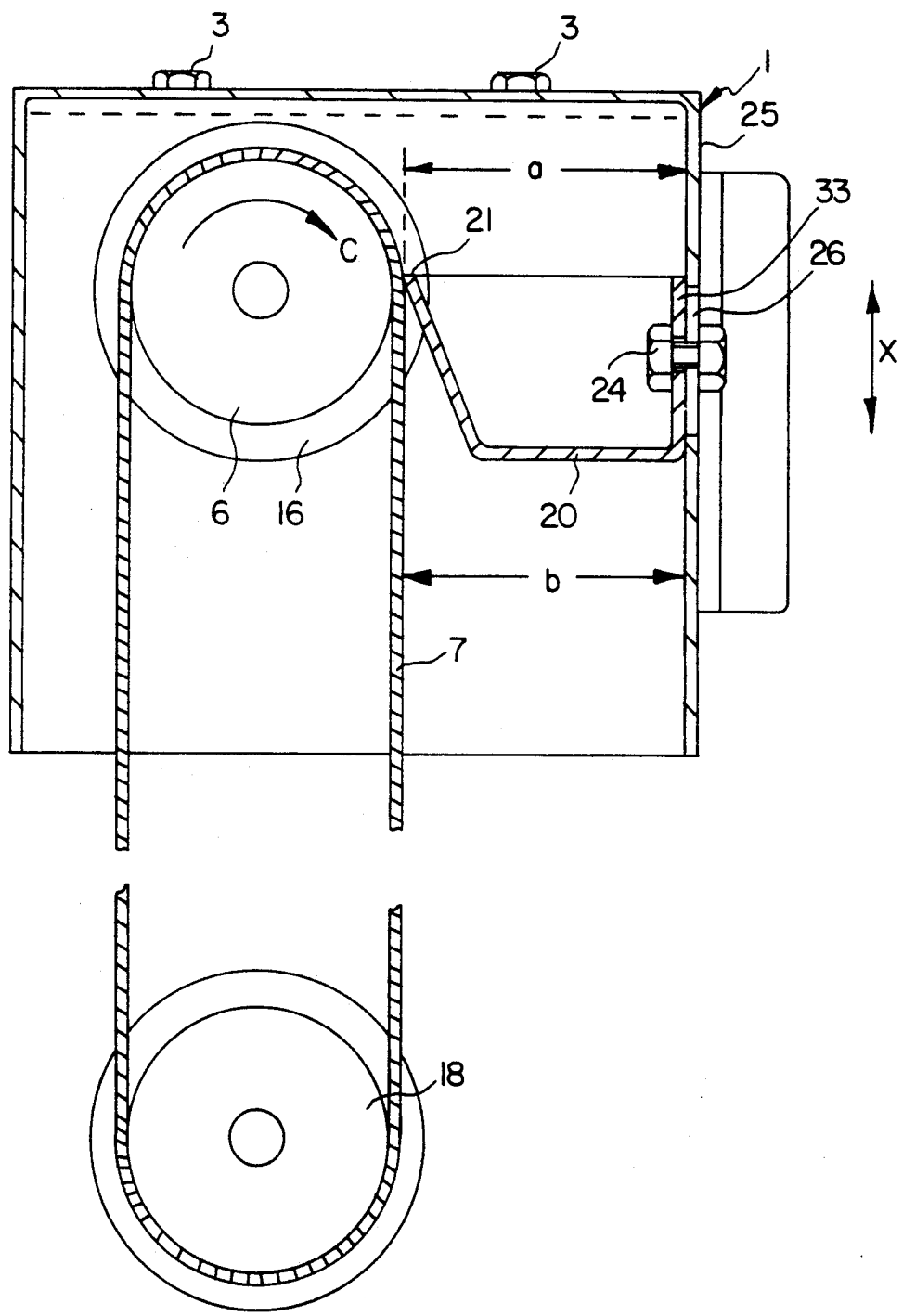
FIG. 3 shows a cross section through the oil skimmer along the line III—III in FIG. 2.
Figure 4:
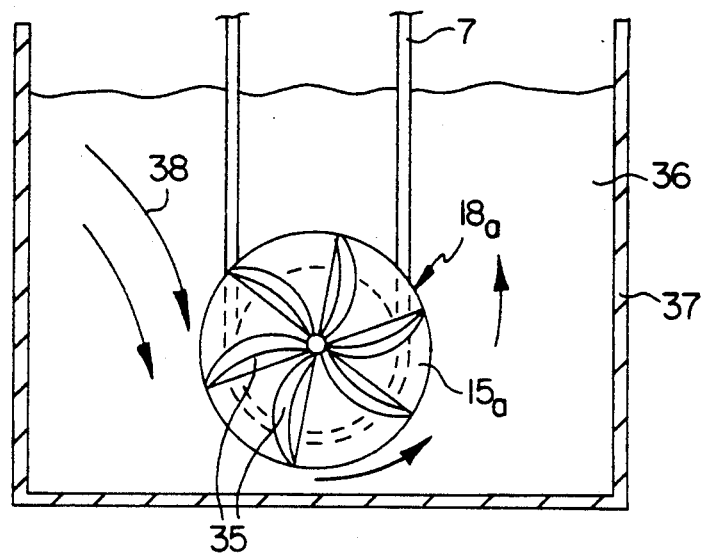
FIGS. 4 and 5 represent further embodiments of the present invention.
Figure 5:
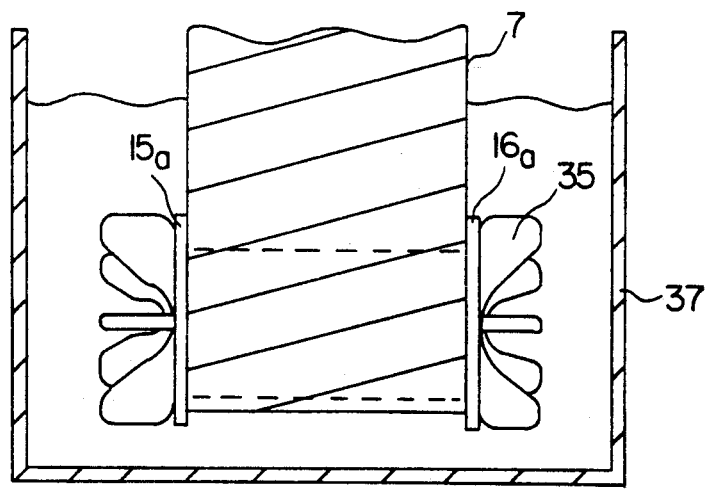

In FIGS. 2 and 3 it can furthermore be seen that the drive roller 6 is provided with a stripper 19. This stripper 19 essentially comprises a collecting trough 20 which forms a stripping edge 21 with respect to the drive roller 6 or to the conveyor belt 7 fed on the drive roller 6. Said stripping edge 21 removes dirt, oil or similar residues from the conveyor belt 7 and conveys said resides into a discharge pipe 22. So that the stripping edge 21 is able to interact appropriately with the conveyor belt 7, the drive roller 6 has a direction of rotation c in accordance with FIG. 3 which is opposed to the stripping edge 21.

It can furthermore be seen that the collecting trough 20 or the stripping edge 21 is adjustable in height in the direction x. In this connection, the collecting trough 20 is fixed to an end face 25 of the skimmer housing 1 by means of a threaded bolt 23 with a matching counternut 24. The threaded bolt 23 projects through a vertically disposed elongated hole 26 and can be moved in the direction x in the latter together with the collecting trough 20.

It can be seen in FIG. 2 that the motor housing 2 contains a geared motor 27 which is joined to an inside wall 29 of the motor housing 2 by means of suitable screws 28. At the same time, the drive shaft 9 also projects through said inside wall 29 and is fed from the geared motor 27 into the axial bore 8.

A timer 34 which also engages in the motor housing 2 is furthermore inserted into the skimmer housing 1 from the end face 25. The geared motor 27 is not shown for the sake of clarity. Connecting leads and control boards are connected to said timer 34. Furthermore, a fuse 30, a cord grip 31 and a main lead 32 are also provided.

The simple construction and assembly of the oil skimmer according to the invention, which also substantially facilitates a repair or a replacement, for example, of the conveyor belt 7, are particularly to be stressed. First, the counter bearing 11 is mounted on the side wall 13 in the chamber 5. Subsequently the drive roller 6 together with the conveyor belt 7 is mounted on the counter bearing 11 and the motor housing 2 with the geared motor 27 inserted is pushed into the skimmer housing 1. This is done from below and from the side so that the drive shaft 9 can easily be fed into the axial bore 8 of the drive roller 6. The motor housing 2 also already contains the fuse 30, the cord grip 31 and the main lead 32, as well as a suitable board for connecting the timer 34. In this connection, simple plug-and-socket connections have been chosen so that the plug-and-socket connections between timer 34 and board can first be made and then the timer can be inserted from the end face 25 of the skimmer housing 1.

The stripper 19 can also be inserted from underneath into the chamber 5 in a simple manner, the stripping edge 21 being fed between the side flanges 15 and 16. It is fixed by means of the threaded bolts 23 which interact with the counternut 24. In this connection it is important that the distance a of the stripping edge 21 from a rear wall 33 of the collecting trough 20 is slightly larger than a distance b of the conveyor belt 7 from the end face 25 of the skimmer housing 1 to which the stripper 19 is also fixed. If the stripper is moved in the direction x, the pressure of the stripping edge 21 on the conveyor belt 1 can consequently also be increased or reduced.

In a further exemplary embodiment of an oil skimmer according to the invention, there are formed onto the side flanges 15a and 16a a weighting roller 18a for a conveyor belt 7 vanes 35, which configure weighting roller 18a as bucket wheels. The geometrical shape of said vanes 35 can be developed in different ways, the requirement of the user always being important in this connection. The vanes 35 produce a suction in a bath 36 inside a trough 37, as is indicated by the arrows 38. An attraction of oil and dirt particles consequently takes place in the direction of the conveyor belt 7, with the result that, even in fairly large containers or containers with different shapes, oil and dirt residues are transported to the belt 7 and are picked up by said belt.

If desired, the vanes 35 should, according to the invention, be deformable or be capable of being turned to a desired shape. In this process, the vanes are matched to a desired suction, or a greater transport performance can be achieved by reshaping the vanes. The vanes themselves may even be, for example, simple metal sheets which are screwed onto, glued onto, or attached in some other way to the side flanges 15a and 16a.

I claim:

1. Apparatus for cleaning a bath of liquid, which comprises: a housing having a chamber therein; a drive roller and a conveyor belt which is fed around the drive roller and which is located at least in part in the chamber and which dips into a bath of liquid, said belt having a direction of rotation and arranged in a longitudinal direction parallel to a wall of the housing, a motor driving said drive roller; and a stripper in the chamber associated with the conveyor belt and having a stripping edge arranged to have a contact pressure on said belt and directed oppositely to the direction of rotation of the conveyor belt operative to remove material from the conveyor belt, and means selectively fixing the stripper to the housing wall and allowing sliding longitudinal movement of the stripper along the housing wall so as to regulate the contact pressure of the stripping edge on the belt.

2. Apparatus according to claim 1, wherein the stripper in the chamber is fixed to the housing so as to be movable in the longitudinal direction of the belt.

3. Apparatus according to claim 1, wherein the distance between the housing wall to which the stripper is fixed and the stripping edge is greater than the distance between the longitudinal direction of the conveyor belt and said housing wall.

4. Apparatus according to claim 1 wherein a surface of the drive roller has a ribbing.

5. Apparatus according to claim 1 wherein the drive roller has an axial bore, wherein a counter bearing fixed to a further housing wall engages said axial bore and wherein a drive shaft also engages said axial bore.

6. Apparatus according to claim 1 wherein the housing comprises a skimmer housing open at the bottom and on one side thereof, and also a U-shaped motor housing which is inserted into the skimmer housing and is fixed to the skimmer housing by means of screws.

7. Apparatus according to claim 1 wherein the motor is provided with a timer.

8. Apparatus for cleaning a bath of liquid, which comprises: a housing having a chamber therein; a drive roller and a conveyor belt which is fed around the drive roller and which is located at least in part in the chamber and which dips into a bath of liquid, said belt having a direction of rotation and arranged in a longitudinal direction parallel to a wall of the housing; a motor driving said drive roller; and a stripper in the chamber associated with the conveyor belt and having a stripping edge arranged to have a contact pressure on said belt and directed oppositely to the direction of rotation of the conveyor belt operative to remove material from the conveyor belt, and means selectively fixing the stripper to the housing wall and allowing sliding longitudinal movement of the stripper along the housing wall so as to regulate the contact pressure of the stripping edge on the belt and wherein the distance between the housing wall to which the stripper is fixed and the stripping edge is greater than the distance between the longitudinal direction of the conveyor belt and said housing wall, and wherein the stripper is formed as a collecting trough whose rear wall is fastened to the housing wall by means of threaded bolts and counternuts, the threaded bolts projecting through vertical elongated holes.

* * * * *